United States Patent [19]

Joh

[11] 4,323,627

[45] Apr. 6, 1982

[54] HOLLOW FIBER AND METHOD OF MANUFACTURING THE SAME

[75] Inventor: Yasushi Joh, Yokohama, Japan

[73] Assignee: Nippon Zeon Co., Ltd., Tokyo, Japan

[21] Appl. No.: 213,877

[22] Filed: Dec. 8, 1980

Related U.S. Application Data

[63] Continuation-in-part of Ser. No. 916,950, Jun. 19, 1978, abandoned, which is a continuation-in-part of Ser. No. 754,973, Dec. 28, 1976, abandoned.

[30] Foreign Application Priority Data

Dec. 29, 1975 [JP] Japan .............................. 50-156316
Jul. 8, 1976 [JP] Japan ................................ 51-81570

[51] Int. Cl.$^3$ .............................................. D02G 3/00
[52] U.S. Cl. ................................. 428/398; 210/500.2; 264/41; 264/561; 264/187; 264/203; 264/209.1
[58] Field of Search ............... 264/177, 41, 561, 187, 264/203, 209.1; 210/500.2; 428/398

[56] References Cited

U.S. PATENT DOCUMENTS

| | | | |
|---|---|---|---|
| Re. 19,329 | 9/1934 | Weingand | 18/57 |
| 2,267,217 | 12/1941 | Reichel | 18/57 |
| 3,441,142 | 4/1969 | Oja | 210/321 |
| 3,527,853 | 9/1970 | Rowley et al. | 264/49 |
| 3,554,379 | 1/1971 | Pye | 210/321 |
| 3,642,773 | 2/1972 | Littman | 260/229 |
| 3,888,771 | 6/1975 | Isuge et al. | 210/500 |
| 3,930,105 | 12/1975 | Christen et al. | 428/398 |
| 4,035,459 | 7/1977 | Kesting | 264/49 |
| 4,086,418 | 4/1978 | Turbak et al. | 536/30 |
| 4,127,625 | 11/1978 | Arisaka et al. | 264/28 |

FOREIGN PATENT DOCUMENTS

49-64573 6/1974 Japan .
49-133614 12/1974 Japan .
50-42121 4/1975 Japan .

*Primary Examiner*—Jay H. Woo
*Attorney, Agent, or Firm*—Hill, Van Santen, Steadman, Chiara & Simpson

[57] ABSTRACT

A method of manufacturing a hollow fiber which comprises providing a spinning solution of a water miscible organic solvent and a high molecular weight compound which may be polyacrylonitrile, a copolymer of acrylonitrile, alpha cellulose, a cellulose ester, polymethylmethacrylate, poly vinyl chloride, or poly-$\gamma$-benzyl glutamate. This spinning solution is extruded through an annular slit while simultaneously, an alkaline or acid aqueous salt solution is extruded from an orifice encircled by the annular slit. The aqueous salt solution has a salt content of 15 to 50% by weight and there is sufficient alkali or acid present in the aqueous salt solution to effect controlled hydrolysis of the high molecular weight compound.

12 Claims, No Drawings

HOLLOW FIBER AND METHOD OF MANUFACTURING THE SAME

REFERENCE TO RELATED APPLICATIONS

This application is a continuation-in-part of my copending application Ser. No. 916,950, filed June 19, 1978 now abandoned, which was a continuation-in-part of my application Ser. No. 754,973, filed Dec. 28, 1976, and now abandoned.

BACKGROUND OF THE INVENTION

1. Field of the Invention

This invention relates to a novel hollow fiber of a high molecular weight compound, and particularly to a hollow fiber having selective permeability which makes it useful for blood dialysis, ultrafiltration, reverse osmosis, and the like. The method involves jointly extruding a spinning solution of the high molecular weight compound about an acid or alkaline reacting salt solution core whereby controlled hydrolysis of the extruded high molecular weight compound is achieved.

2. Description of the Prior Art

Recently, semipermeable hollow fibers have been used for blood dialysis, for fluid separation based upon the principle of ultrafiltration, and for reverse osmosis.

Hollow fibers should have a uniform cross section since when such a fiber is used, for example, for blood dialysis the pressure in the inerior of the hollow fiber usually exceeds that at the exterior of the hollow fiber. If the hollow fiber is not uniform in thickness, there exists the possibility that the fiber may be broken at its thinnest part. Also, it is known that when the cross section of the hollow fiber is significantly non-circular, blood is apt to coagulate in the hollow fiber.

When the hollow fiber is used for reverse osmosis, high pressures of up to 100 atmospheres may be applied to the outside of the hollow fiber. In this instance, it is necessary that the cross section of the hollow fiber should be close to a true circle and that the thickness of the wall of the hollow fiber should be uniform. Otherwise, the hollow fiber may become significantly deformed. When the cross section of the hollow fiber is not uniform, the polarized concentration due to nonuniform flow substantially reduces the permeability performance of the fiber.

In a known method of producing hollow fibers, a spinning solution or dope is extruded from an annular slit of a double pipe orifice to form a sheath solution and simultaneously, a gaseous or liquid fluid is extruded through the inside pipe of the double pipe orifice to form a core fluid. Where a gaseous material such as an inert gas is used as a core fluid, the resulting hollow fiber is apt to be crushed because the direction of the extruded filament after being spun is usually changed by means of a guide bar in the coagulation and washing bath. When the moving filament is pressed on the guide bar with appreciable force, it is quite often deformed to a flat configuration which is unsuitable.

These disadvantages are reduced through the use of a melt spinning procedure. However, it is difficult by means of this procedure to produce a hollow fiber having a favorable selective permeability.

A wet spinning process has been proposed to overcome these difficulties and to provide a wide range of controllability. In the wet spinning process, the spinning conditions such as spinning solution concentration and coagulation bath conditions can be varied widely. However, it is difficult to produce a hollow fiber of a uniform shape by this process, and the production rate is usually very low because of the low speed of spinning.

In the case where the core being extruded is liquid instead of gaseous, the deformation of the moving filament at the guide bar is considerably avoided. However, another problem may be developed which is a rapid coagulation of the sheath by the instantaneous diffusion of the core liquid into the sheath immediately after being spun. Specifically, a thin skin layer is first formed on the inner interface of the spun sheath in contact with the core liquid, and another thin layer is formed on the outer surface of the spun sheath by contact with the coagulation bath liquid when the moving filament is introduced into the coagulation bath. These two layers determine the dimensional configuration of the hollow fiber, and subsequent coagulation between the two layers usually develops numerous macro-voids in the membrane of the hollow fiber. These voids serve to scatter light and as a result the resultant hollow fiber looks whitish. Selective permeability cannot be obtained from such a fiber because the membrane has unfavorable macro-voids instead of the desired micro pores. Furthermore, spinnability is very poor because of the rapid coagulation of the dope immediately after being spun. The hollow fiber can be obtained only at low speeds, at most up to 15 m/min, and has very poor mechanical properties. Also, the skin layers formed on both the inner and outer surfaces of the hollow fiber lower the permeability of the fiber.

A dry jet-wet spinning method in which the dope is extruded into a gaseous space and is then introduced into a coagulation liquid is considered to be preferable for producing hollow fibers having suitable permeability. In this method, a spinning dope is extruded from an annular slit to form a sheath dope, and the extruded sheath dope passes through a gaseous space before being introduced into a coagulation bath. The gaseous space may be occupied by an inert gas or air, or it may contain the vapor of the solvent of the spinning dope. The core liquid is preferably non-coagulative at least before the spun dope is introduced into the coagulation bath. For example, in the production of hollow fibers of cellulose by the cuprammonium process, liquids such as benzene, toluene, trichloroethylene, n-hexane, or perchloroethylene, which are miscible with water are employed as core liquids. With this method, the organic core liquid must be removed from the hollow fiber later in the process, and this involves long troublesome operations. Furthermore, from the standpoint of pollution problems, the use of toxic organic solvents is to be avoided.

When the hollow fiber is used for medical purposes such as in blood dialysis and for any process involving foods, for example, concentration of juices, the toxic organic materials must be completely washed out from the hollow fiber.

SUMMARY OF THE INVENTION

The present invention provides a method of manufacturing a hollow fiber wherein the spinning solution is made up of a water miscible organic solvent and a high molecular weight compound which may be polyacrylonitrile, a copolymer of acrylonitrile, alpha cellulose, a cellulose ester, polymethylmethacrylate, poly vinyl chloride, or poly-γ-benzyl glutamate. The water miscible organic solvent is preferably a non-polar solvent. The spinning solution is extruded through an annular slit, and simultaneously therewith, an alkaline or acid aqueous salt solution is extruded from an orifice which is encircled by the annular slit. The aqueous salt solution has a salt content of 15 to 50% by weight, and is capable of developing a phase separation with the solvent by a salting out effect, there being sufficient alkali or acid present in the aqueous salt solution to effect controlled hydrolysis of the high molecular weight compound. The aqueous salt solution is a non-coagulant for the spinning solution. Coagulation is accomplished by introducing the spinning solution with the aqueous salt contained therein into a coagulating bath.

DESCRIPTION OF THE PREFERRED EMBODIMENTS

According to a preferred embodiment of the present invention, the membrane of a hollow fiber can be selectively hydrolyzed. Where the membrane is partially hydrolyzed, the degree of hydrolysis may vary from the inner wall surface of the membrane to the outer wall surface thereof. Under certain conditions, it is even possible to produce a hollow fiber whose inner wall surface is completely hydrolyzed and whose outer wall surface is not hydrolyzed at all.

According to a further embodiment of the invention, a hollow fiber can be produced which is very hydrophilic at its inner wall surface. In a further embodiment of the invention, a hollow fiber can be produced in which portions closer to the inner wall surface in the membrane are more hydrophilic.

For producing hydrolyzed types of hollow fibers mentioned above, it is preferred that the high molecular weight compound contain a hydrolyzable group in the side chain of the polymer. Hydrolyzable groups such as carboxylic esters, sulfonic esters, amides, and the like yield hydroxy groups, carboxylic acid groups, amino groups, and sulfonic acid groups by hydrolysis.

It is also possible to use a natural high molecular weight compound such as cellulose, a modified natural polymer such as cellulose esters, or synthetic polymers with or without a hydrolyzable side chain for the purpose of the present invention. A blend of two or more of the polymers can also be used.

Examples of suitable cellulose derivatives are cellulose acetate, cellulose butyrate, cellulose propionate, cellulose acetate butyrate, and cellulose acetate propionate. For these and other cellulose esters, the degree of acetylation is usually from 30% to 65%.

Besides the carboxylic esters of cellulose, esters of other acids such as nitric acid, sulfuric acid and other derivatives can be used in this invention. For example, methyl cellulose containing 38% methoxy groups, ethyl cellulose containing 46% ethoxy groups, oxyethyl cellulose, benzyl cellulose, cyano ethyl cellulose, sulfuric cellulose, and phosphoric acid cellulose can be used. In addition, natural polymers such as high grade alpha cellulose or cellulose pulp can be used.

As previously mentioned, other synthetic resins can also be used such as polyacrylonitrile, copolymers of acrylonitrile, polymethylmethacrylate, poly vinyl chloride, and poly-$\gamma$-benzyl glutamate can also be employed.

The spinning solution for this according to the present invention results from dissolving one of the polymers in an organic solvent which is preferably miscible with water.

Typical organic solvents which dissolve cellulose derivatives are dimethyl acetoamide, dimethyl formamide, dimethyl sulfoxide, tetramethylene sulfone, $\gamma$-butyl lactone, acetone, methyl ethyl ketone, methylacetate, methyl lactate, ethyl lactate, dioxane, tetrahydrofuran, methylene chloride, methyl Cellosolve, methyl Cellosolve acetate, nitromethane, nitropropane, furfural, glacial acetic acid or a mixed solvent containing two or more of the above. Such a mixed solvent may be nitromethane-methanol (8:2), nitropropane-ethanol (7:3), nitropropane-methanol (8:2), methylene chloride-ethanol (9:1), ethylene dichloride-ethanol (9:1), acetone-ethanol (9:1), acetone-water, acetonetriethylene glycol or the like.

The most preferable organic solvents are those which are water miscible because they improve the desolvating mechanism and the pore formation. It is also desirable to use in most instances a solvent which is non-polar, meaning that it has a dipole moment of less than $3 \times 10^{-18}$ esu.

The core solution is either naturally alkaline or acidic, or sufficient amounts of alkaline materials or acidic material can be added to the salt solutions to render them so. By "acidic" I mean that the pH of the solution is less than 6 and by "alkaline" I mean that the pH of the solution is greater than 8.

Examples of inorganic salts which are essentially neutral in solution but which can be used in conjunction with suitable acid or alkaline materials include lithium salts such as lithium chloride or lithium bromide; sodium salts such as sodium chloride, sodium bromide, sodium sulfate, sodium sulfite, sodium nitrate, sodium chlorate, sodium phosphate, and the like. Potassium salts such as potassium chloride, potassium bromide, potassium sulfate, potassium hydrogen sulfate, potassium chlorate, potassium nitrite, potassium nitrate, potassium thiocynate and potassium sulfate can also be used. Suitable magnesium salts include magnesium chloride, magnesium bromide, magnesium bromate, magnesium sulfate, magnesium hydrogen sulfate, magnesium chlorate and magnesium nitrate. Among the calcium salts which are useful are calcium chloride, calcium iodide, calcium hypophosphate, calcium nitrate, calcium nitrite, calcium phosphate, and calcium dihydrogen phosphate. In addition to the above described salts, cadmium chloride, cadmium nitrate, zinc chloride, zinc sulfate and zinc nitrate may be used. The inorganic salts should be soluble in water or in the acid or alkaline medium at least to the extent of 15 to 50% by weight so that hydrolysis of the high molecular weight compound can occur.

In addition to the inorganic salts, organic salts may also be used. Examples of such salts are the alkali metal salts of of carboxylic acids, alcoholates, phenolates, and sulfonic acid salts. Alkali metal salts of the carboxylic acids include the salts of citric acid, tartaric acid, formic acid, acetic acid, butyric acid, succinic acid, stearic acid, benzoic acid, propionic acid, oxalic acid, malonic acid, valeric acid, capronic acid, lauric acid, myristic acid, palmitic acid, acrylic acid, glutaric acid, adipic acid, maleic acid, fumaric acid, glycolic acid, lactic acid, malic acid, pryuvic acid, acetoacetic acid, and levulinic acid. As example of alcoholates, there may be mentioned sodium methoxide and sodium ethoxide. Suitable phenolates are sodium phenoxide and potassium phenoxide. As examples of organic sulfonic acid salts there may be mentioned sodium benzene sulfonate, sodium p-toluene sulfonate, potassium p-toluene sulfonate, ammonium benzene sulfonate, sodium benzene sulfonate, and potassium benzene sulfonate, and the like.

Salts which exhibit self-buffering properties can also be used. For example, ammonium chloride and ammonium sulfate give an acidic reaction in water. Inorganic salts which exhibit an alkaline reaction water are sodium carbonate, potassium carbonate, sodium hydrogen carbonate, sodium phosphate, sodium acetate, sodium phenoxide, and potassium ethoxide. Mixtures of two or more of the above salts may also be used. To modify the pH, an acidic or basic reagent can be added to the aqueous salt solution.

To prepare the acidic or basic solution from a neutral salt, suitable acids such as hydrochloric acid, sulfuric acid, phosphoric acid, acetic acid, or dichloroacetic acid may be used to make the solution acidic, while ammonia, sodium hydroxide, potassium hydroxide, lithium hydroxide or the like may be added to make the salt solution basic. The salt concentration in the core liquid regardless of the use of the inorganic or organic salt must be sufficiently high so that a phase separation develops between the core liquid and the solvent of the spinning solution.

By utilizing the salting out effect, interfacial hydrolysis of the sheath materials can be carried out, that is, the hydrolysis reaction by acid or alkali on the interface between the core liquid and the sheath dope can be performed. When the concentration of the salt is too low, there is not enough present to develop the phase separation between the core and sheath solutions, so that the spinnability becomes poor.

A small amount of organic material, for example, ethyl alcohol can be included in the aqueous core solution if the organic material can be uniformly mixed with the aqueous core solution. The acidity or basicity of the core solution may be varied in accordance with the purpose for which the hollow fiber is to be used. The kind of acidic or basic reagent, and the pH used in the core solution depends on the degree of hydrolysis required and also depends on the chemical behavior of the high molecular weight compound used for the hollow fiber.

In a typical example of manufacturing the hollow fiber according to the present invention, the spinning dope solution is extruded downwardly from the annular slit of a nozzle, and the spun filament is led into a coagulating bath after passing through a gaseous space of at least 5 mm in length. A hollow fiber having a uniform circular cross section can thus be obtained. The outside and inside diameter in cross section, and the thickness of the membrane of the resulting hollow fiber can be controlled by adjusting the spinning conditions.

The process of the present invention can be used to provide a perdetermined selective permeability to the hollow fiber according to the following mechanism. As the spinning dope is extruded from the annular slit to form the sheath solution and the salt solution is extruded into the hollow portion of the sheath, and the spun filament is directed to a coagulation bath after passing through a gaseous space longer than 5 mm, if no positive action is taken to evaporate the solvent of the dope, the outer surface of the moving filament varies little from the inside of the filament. In such a case, the filament can be led into a coagulation bath without forming a hard, dense skin layer on the outer surface of the filament. Since the core solution contains a salt in considerable amounts, the core solution and the dope are separated into two phases. The take-up speed of the fiber at the take-up roll can then be increased to relatively high values on the order of 180 m/min. When the moving filament is led into the coagulation bath, mutual diffusion takes place between the solvent in the filament and the water in the bath from the outer surface of the filament. The outer surface is thus rapidly coagulated by the strong coagulating action of the water. The outer portion close to the surface of the filament is then subjected to coagulation. As this proceeds, the solvent in the dope is replaced with penetrating water to develop favorable micro-pores in the membrane of the hollow fiber.

The core solution and the solvent in the sheath dope are separated by a salting out effect before being introduced into the coagulation. In the bath, the concentration of the solvent decreases as the water from the coagulation bath penetrates into the sheath dope. This results in the disappearance of the phase separation, which allows the mutual diffusion process between the core and the sheath solutions to begin. This process produces very favorable micro-pores in the membrane of the resultant hollow fiber. Then, based on the principle of osmosis, water is percolated into the hollow portion of the fiber from outside so as to lower the concentration of salt in the aqueous core solution. As a result, the interior portion of the hollow fiber is at a positive pressure which helps to maintain a circular cross section of the resulting hollow fiber. Consequently, the hollow fiber does not tend to deform at the guide bar when its direction is changed.

Since the coagulation begins first from the outer surface of the sheath. the diffusion of water from the core liquid into the sheath begins a little later. When the concentration of solvent in the sheath dope is lowered, the sizes of pores in the membrane become much smaller in the portions closer to the inner surface of the hollow fiber. The reason is probably that when the diffusion of water starts from the core side, the sheath has already been densified in structure because some coagulation has already taken place from the outside.

While the extruded dope sheath passes through the gaseous space, the solvent of the sheath can be evaporated to a certain extent. The outer surface of the moving filament thereby becomes more dense. Under these conditions, the sizes of pores in the resulting hollow fiber membrane are larger in the portions nearer to the inner wall surface of the hollow fiber. The solvent may be evaporated from the moving sheath in a spinning cell where a heated inert gas is flowing so that phase separation is no longer maintained between the core and sheath solutions. In such a case, the water can penetrate into the sheath dope as the concentration of solvent in the sheath is lowered. The moving filament is then led into the coagulating bath. Thus, a different type of selective permeability can be given to the hollow fiber.

Ideal pores can be provided in the membrane of the hollow fiber by two actions which occur during coagulation and washing. One involves the movement of the aqueous core solution containing salt toward the outside of the membrane with the disappearance of phase separation, utilizing the principles of diffusion and dialysis. The other is the penetration of water into the hollow portion through the membrane from the outside so as to lower the concentration of salt in the core solution based on the principle of osmosis.

The mutual diffusion which exists between the aqueous core solution and the solvent of the sheath dope differs depending upon the kind and the bulkiness of the cation or anion present. Thus, by selecting suitable conditions, the selective permeability of the resulting hollow fiber can be widely varied. The running distance of the extruded dope filament between the nozzle and the surface of the coagulation bath can also be varied. If desired, a positive action to evaporate the solvent from the running dope filament to a desired extent can be undertaken before the filament is introduced into the coagulation bath. On the contrary, evaporation of the solvent may also be prevented substantially, for example, by covering the running filament with a cylindrical hood. Inside the hood, the vapors of the solvent can be introduced to minimize evaporation from the sheath.

In accordance with the present invention, the membrane of the hollow fiber can be partially or totally hydrolyzed in special ways. For example, if the core solution is basic or acidic, and the sheath dope is made of acetone and cellulose acetate, the inner wall of the sheath dope can be hydrolyzed at the interface. During the phase separation, the aqueous core solution cannot penetrate into the inside of the sheath dope, and the internal portion of the sheath dope cannot be allowed to react with alkali. Accordingly, it is possible to hydrolyze the inside wall of the membrane to a limited extent.

The membrane of the hollow fiber can be partially or totally hydrolyzed, depending on the manufacturing conditions. When an alkali core solution is removed from the hollow portion of the cellulose acetate hollow fiber under conditions such that the inside wall of the membrane is hydrolyzed to a limited extent, then a thin layer of cellulose is regenerated around the inside wall of the membrane which functions as an active layer for selective permeability. The major portion of the membrane still remains as cellulose acetate which acts as a substrate.

In the process of the present invention, I can produce a hollow fiber in which the degree of hydrolysis is higher in portions nearer to the inner surface of the membrane than at the outer surface. As previously described, the alkali or acidic core solution contacts the spinning solution at the interface. When the filament is led into the coagulation bath, the phase separation disappears. Then, the alkali or acidic core solution begins to diffuse into the sheath dope. When the membrane contacts water in the coagulation bath, the water penetrates into the membrane from the outside by virtue of osmosis. The concentration of the alkali in the membrane is thus lower in the portions nearer to the outer surface of the membrane. Accordingly, a novel hollow fiber can be obtained in which the degree of hydrolysis is lower in the portions nearer to the outer surface of the membrane. When cellulose acetate is used as the spinning solution, a novel hollow fiber is produced in which the inside wall of the membrane is made of regenerated cellulose, and the outside of the membrane is composed of cellulose acetate.

A hollow fiber can also be produced in which the fiber membrane is more hydrophilic in the portions closer to the inside wall. For example, using a spinning dope composed of polyacrylonitrile dissolved in dimethyl formamide such a solution can be extruded about an aqueous core solution containing sodium carbonate and sodium hydroxide. The hydrolysis reaction occurs at the contact interface between the core and sheath solutions. A major part of the dimethyl formamide is evaporated from the spun sheath dope when the filament passes through a spinning cell. As the solvent evaporates, the phase separation disappears. The aqueous alkali solution thus gradually penetrates into the sheath membrane. When the filament is led into the coagulation bath, the dimethyl formamide retained in the membrane diffuses out into the water of the coagulation bath, and the alkali moves outward through the membrane, while water comes into the interior aqueous core portion through the membrane from the outside. As a result, the concentration of alkali in the outer portion of the membrane is greatly diluted. By using suitable conditions, a hollow fiber can be produced in which the inner surface of the membrane is hydrolyzed to polyacrylic acid, and the portions of the membrane close to the inner surface are partially hydrolyzed to a mixture of polyacrylic acid and polyacrylamide. The outside portions of the membrane close to the outer surface are partially hydrolyzed to form a mixture of polyacrylamide and polyacrylonitrile. The outer surface of the membrane still consists of polyacrylonitrile. In such a hollow fiber, the membrane is more hydrophilic in the portions closest to its inner surface.

A hollow fiber can be produced in which the membrane is more swellable in water in portions nearer to its inner surface than to its outer surface. For example when polymethylmethacrylate is used as the starting material, a hollow fiber can be manufactured in which the inner surface of the membrane or inside portions close to the inner surface are mainly polymethacrylic acid, and the content of polymethacrylic acid decreases toward the outer surface of the membrane which exists as polymethylmethacrylate, in unhydrolyzed form. This hollow fiber evidences more swellability in the portions nearer to the inner surface. The degree of hydrolysis in various portions of the membrane can be controlled by the selection of the manufacturing conditions. For example, the alkali core solution can be removed from the interior portion by cutting both ends of the fiber to a certain length, and then subjecting the cut open hollow fiber to washing. When an acidic aqueous coagulation bath, for example, containing acetic acid is used, the acetic acid penetrates into the membrane to neutralize the alkali in the membrane to form a buffer solution. In this case, only the inner surface or the portions close to the inner surface can be hydrolyzed. In order to prevent the dissolution of the hydrolyzed parts in water, a small amount of a hydrophobic polymer may be incorporated by copolymerization into the starting material. Such a hydrophobic monomer may be styrene, for example.

By using the method of the present invention, a hollow fiber which has superior anti-thrombus properties can be produced. Recently, a blood dialysis apparatus using hollow fibers has become widely used, since it has many advantages. However, it has a serious disadvantage that blood is apt to clot in the hollow fiber. Such a disadvantage has been thought to be inevitable, since blood flows through the very narrow hollow portion of the fiber. A hollow fiber having hydrophilic inner surfaces, as produced according to the present invention, exhibits a remarkable anti-thrombus property. The reason is not clear at present, but it is presumably due to the hydrogel effect of the swollen wall or the existence of negative charges from the carboxylic acid present at the inner surface.

The hollow fiber of the present invention has improved hydrophilic properties and improved mechanical properties. The hydrolyzed portions which are hydrophilic and tend to be inferior in mechanical strength are supported by means of adjoining less hydrolyzed portions which are relatively hydrophobic and have good mechanical strength. Accordingly, the hollow fiber according to the present invention is, as a whole, superior in mechanical strength and moreover has a good selective permeability. Although the molecular weight of the inner surface of the hollow fiber is more or less lowered by hydrolysis, the high mechanical strength can be obtained in the outside portion of the membrane having a high molecular weight.

The hollow fibers produced according to the present invention may maintain their good selective permeability even after the fiber is dried. It is generally known that the selective permeability of membranes is irreversibly lowered after being dried. For example, a wet cellophane produced by the viscose process has a good selective permeability. However, when the cellophane is once dried and again wetted, the selective permeability of the gelled cellophane cannot be reproduced. The same can be said for a membrane of cuprophane produced by cuprammonium process. Such a membrane for use in blood dialysis has to be plasticized with glycerine to prevent reduction of its selective permeability during storage in the dry state. It appears that the selective permeability of the membrane is lowered after being dried because crystalline regions are developed by movement of molecular chains accompanying the relaxation of the superstructure which results in the collapse of micro-pores in the membrane.

The change or relaxation of the structure seems to be correlated with the swellability or elongation in the wet state and with the shrinkage behavior during drying. A greater change of volume during drying suggests a greater change of the structure or relaxation of the structure. The micro-pores of the membrane are collapsed with such relaxation. The cellulose membranes which are most widely used for blood dialysis exhibit a great change in volume between their wet and dry states, giving rise to a large disadvantage because of the structural change or relaxation upon drying.

A hollow fiber according to the present invention overcomes these disadvantages. For example, a hollow fiber made of cellulose acetate by the method according to the present invention may have an inner surface consisting of a regenerated cellulose having a high selective permeability, while the major portion of the membrane which supports the inner surface is composed of hydrophobic cellulose acetate. When the hollow fiber is dried and again wetted, the change of volume is controlled by the cellulose acetate substrate which constitutes the major portion of the membrane. Consequently, the hollow fiber does not evidence a large volume change as does conventional cellulose. This is probably the reason why the selective permeability can be maintained after the membrane is dried. This characteristic is also exhibited in hollow fiber made of polyacrylonitrile and polymethylmethacrylate, whose inner surfaces are hydrolyzed to polyacrylic acid and polymethacrylic acid, respectively. The hydrolyzed inner portion is very hydrophilic in nature and has a high selective permeability. The disadvantage of the inner surface portion being weak in mechanical properties by itself is overcome by being supported with hydrophobic, strong unhydrolyzed polymer substrate. Accordingly, the hollow fiber is, as a whole, superior in mechanical strength and selective permeability.

The hollow fiber blood dialyzer currently on the market must be filled with formalin solution which solution must be removed completely before it is used for therapy. However, the hollow fiber used for blood dialysis according to the present invention can be stored and transported in the dry condition which makes it more convenient and safer in handling.

With the process of the present invention, a hollow fiber having a substantially circular cross section and uniform thickness can be manufactured. One of the features of the present invention resides in the discovery that to produce a hollow fiber having a true circular cross section and uniform thickness, there must exist a certain length between the nozzle and the coagulation bath surface, contrary to accepted practice in this field. The length should be at least 5 mm and preferably longer than 10 mm. When the space is too short, the resultant hollow fiber has an uneven thickness, and the wall thickness is not properly controllable.

The thickness of the sheath dope depends on the surface tension of the dope around the core solution during the passage of the spun dope in the gaseous space. If the space is too short, the dwell time of the filament in the space is too short to average out the thickness of the sheath solution. This type of averaging effect can only be attained when the core solution is phase separated from the sheath dope. To attain a satisfactory uniform thickness of the sheath dope, however, a distance longer than 5 mm is necessary otherwise the unevenness of the sheath dope thickness appears in the final hollow fiber. Since it is difficult to position the inner orifice of the core liquid concentrically with the annular slit, the averaging effect of the sheath dope is very significant. When the nozzle contains a plurality of holes, it is more difficult, and almost impossible to have all of the holes in the nozzle concentrically positioned with the double pipe orifice.

As the extruded dope filament runs through the gaseous space, the core aqueous solution containing salt and the filament react with each other in subtle ways. A small amount of the solvent of the sheath solution penetrates into the core solution through the boundary interface, while a small amount of water diffuses into the sheath solution through the interface during the time that the filament is moving through the gaseous space. This gives a slight amount of gellation to the sheath solution which contributes to the improvement of spinnability and also improves the permeability of the resultant hollow fiber.

The coagulated filament maintains its true circularity in cross section in the coagulation bath. The spun dope filament changes its direction in the coagulation bath and the washing water bath by means of guide bars. After going through the processes mentioned above, the hollow fiber is wound up on a take-up coil. During these processes, the filament is strongly pressed on the guide bar several times. The coagulating filament may thus become flat or deformed. Nevertheless, the flat or deformed filament easily recovers its circularity in cross section. The reason is that water rapidly penetrates through the membrane into the core so as to dilute the salt concentration according to the principle of osmosis, and the interior portion is always at a positive pressure. This is one of the substantial advantages of the present invention.

Various methods for producing the hollow fiber of the present invention will be described in the succeeding examples, and compared with prior art procedures identified as "reference examples". It should be understood that this invention is not limited to the examples, but various modifications are possible within the scope of the appended claims.

REFERENCE EXAMPLE 1

A spinning solution was prepared from 30 parts of cellulose acetate having a mean degree of polymerization of 150 and a degree of acetylation of 39.8% dissolved in a mixed solvent of 60 parts of acetone and 10 parts of triethylene glycol. This solution was extruded into a gas medium by a constant feeding pump from an annular slit. The slit had an external diameter of 2.0 mm and an internal diameter of 1.4 mm. Simultaneously water was extruded from an inner orifice positioned concentrically with the annular slit. The spinning solution extruded from the annular slit instantaneously became whitish and had very poor thread forming property. The fiber obtained was very brittle and was practically useless. The reason was that a mutual diffusion rapidly developed between the extruded sheath spinning solution and the water in the core liquid so that numerous unfavorable macro-voids were produced in the membrane of the fiber. The takeup speed of the fiber was, at most, 13 m/min.

REFERENCE EXAMPLE 2

A ternary copolymer of acrylonitrile-methylacrylatemethallyl sulfonic acid (93:3:4) having an intrinsic viscosity of 1.6 dl/g in dimethyl formamide at 30° C. was dissolved in dimethyl formamide to prepare a 30% spinning solution. The solution was extruded into a mixed coagulating bath of dimethyl formamide and water from an annular slit. The slit had an external diameter of 1.5 mm and an internal diameter of 1.0 mm. Simultaneously, a 3% sodium phosphate aqueous solution was extruded from an inner orifice. The filament extruded from the orifice instantaneously became whitish and had a poor thread forming property. The results were the same even when the conditions of the spinning operation were changed in various ways.

A similar result as in this example was obtained when 28 parts of cellulose acetate having a mean degree of polymerization of 180 and a degree of acetylation of 40% was dissolved in a mixed solvent of 60 parts of acetone and 10 parts of triethylene glycol to prepare a spinning solution, and a 3% sodium chloride solution was used as a core solution.

EXAMPLE 1

A spinning solution was made up from 30 parts of cellulose acetate having a mean degree of polymerization of 150 and a degree of acetylation of 39.8% dissolved in a mixed solvent of 60 parts of acetone and 10 parts of triethylene glycol. The spinning solution was extruded at 35° C. by a constant feeding pump from an annular slit having an external diameter of 2.0 mm and an internal diameter of 1.4 mm. Simultaneously an aqueous solution containing 20% sodium chloride and 5% sodium hydroxide was extruded as a core solution. The extruded filament was passed through a spinning cell having a length of 1 m in which a nitrogen gas of 70° C. was flowing countercurrently at a rate of 1 m/sec, after which the filament introduced into a coagulating water bath.

The spinnability of the filament was excellent and the extruded dope had a good thread forming property. The maximum take-up speed was 130 m/min. The fiber obtained was not whitish but transparent. The fiber was washed in a water bath at 20° C. to remove the salt solution in the interior portion thereof, introduced into a glycerine bath for plasticization, and thereafter dried at 60° C. to a constant length. The resulting hollow fiber had a high tensile property and a dry strength of 2.2 g/d. The hollow fiber showed excellent permeabilities for urea, creatinine, sodium chloride and vitamin $B_{12}$.

The membrane of this hollow fiber was divided into two parts, one near to the internal wall surface and the other closer to the external wall surface. By means of an infrared spectra for these two parts, it was found that the part closer to the external wall surface had an absorption spectrum similar to that of cellulose acetate, while the infrared spectrum for the part closer to the internal wall surface showed a substantial decrease of carbonyl groups and the development of new peaks due to the formation of hydroxy groups. This portion gave an absorption spectrum similar to that for cellulose. These data indicated that cellulose was regenerated by the hydrolysis of cellulose acetate at the portions nearer to the internal wall surface, particularly at the wall surface. The hollow fiber after being dried had a permeability substantially the same as before being dried. The permeability was measured as clearance as follows using pseudo blood dialysis:

|  | Clearance | |
| --- | --- | --- |
|  | Before drying | After drying |
| Urea | 152 | 153 |
| Uric Acid | 112 | 106 |
| Vitamin $B_{12}$ | 22 | 24 |

The clearance $C_L$ is defined in the following formula:

$$C_L = Q_B \frac{C_{Bi} - C_{Bo}}{C_{Bi}},$$

where $Q_B$ stands for the pseudo blood flow rate (ml/min) and $C_{Bi}$ and $C_{Bo}$ for the concentrations of ingredients at the inlet and the outlet of the pseudo blood, respectively.

EXAMPLE 2

A spinning solution was made up from 28 parts of cellulose acetate having a mean degree of polymerization of 185 and a degree of acetylation of 40% in a mixed solvent of 69 parts of acetone and 3 parts of water. The spinning solution at 38° C. was extruded as a sheath solution from an annular slit having an external diameter of 1.5 mm and an internal diameter of 1.0 mm. Simultaneously an aqueous solution containing 27% sodium chloride and 3% potassium hydroxide was extruded as a core solution. The extruded dope was passed through a spinning cell having a length of 2 m in which a nitrogen gas at 90° C. was counter-currently flowing at the rate of 1.2 m/sec. The filament was introduced into a coagulating bath consisting of an aqueous solution of 20% acetone. The fiber was subsequently washed by means of a 1% acetic acid aqueous solution.

The spinnability of the fiber was excellent and the spun dope had an excellent thread forming property. The hollow fiber had a uniform cross section consisting of a true circle which was obtained in a very stable condition at a take-up speed of 125 m/min. The fiber was washed in a water bath at 20° C. to remove the salt and then plasticized by glycerine and dried at 60° C. to a constant length.

The hollow fiber obtained was strong and a dry tensile strength of 1.8 g/d. The fiber had good permeability and ultrafiltration properties. The membrane of the fiber was divided into two parts, one being closer to the internal wall surface and the other being closer to the external wall surface. The part closer to the external wall surface showed an absorbtion spectrum similar to that for cellulose acetate while the one closer to the inner surface showed an absorbtion spectrum similar to that cellulose, which indicated that hydrolysis had taken place in this portion.

EXAMPLE 3

Cellulose acetate having a mean degree of polymerization of 180 and a degree of acetylation of 39.8% in an amount of 28 parts was dissolved in a mixed solvent of 69 parts of acetone and 3 parts of ethanol. This spinning solution was extruded at 40° C. as a sheath solution, and simultaneously an aqueous solution containing 20% calcium chloride and 5% concentrated hydrochloric acid was extruded as a core solution. The spinnability was excellent and the fiber was transparent and could be produced at a take-up speed of 135 m/min. The spun filament was passed counter-currently through a nitrogen gas stream at a temperature of 80° C. which was flowing at a rate of 1.5 m/sec, and thereafter was introduced into a mixed bath of water and calcium chloride (80:20). The fiber was then coagulated in a water bath and washed. After the core liquid had been removed, it was washed and plasticized by glycerine, and dried at 20° C. The resultant hollow fiber had a cross section similar to a true circle and a very high degree of uniformity. The hollow fiber was strong and had excellent permeability and ultrafiltration properties.

EXAMPLE 4

A spinning solution was made up from 30 parts of cellulose acetate having a mean degree of polymerization 150 and a degree of acetylation of 39.8% dissolved in a mixed solvent of 60 parts of acetone and 10 parts of triethylene glycol. The solution was maintained at 38° C. and was extruded as a sheath solution into a mixed bath at 30° C. of water-acetone (80:20) by wet spinning. Simultaneously, an aqueous solution containing 30% calcium chloride and 5% concentrated hydrochloric acid was extruded as a core solution. The spun gelled fiber was subsequently washed in a water bath at 25° C. then plasticized by glycerine and dried to a constant length. The resulting hollow fiber was substantially transparent and had a uniform cross section closely approximating a true circle. It had excellent ultrafiltration properties. The spectrometric examination of this fiber showed that hydrolysis had taken place in a portion near to the inner wall surface of the hollow fiber, where cellulose was regenerated.

EXAMPLE 5

Cellulose acetate having a mean degree of polymerization of 170 and a degree of acetylation of 39.8% in an amount of 30 parts was dissolved in a mixed solvent of 60 parts of acetone and 10 parts of triethylene glycol. This spinning solution was extruded by means of a constant feeding pump from an annular slit having an external diameter of 2.0 mm and an internal diameter of 1.2 mm. Simultaneously, an aqueous solution containing 20% ammonium chloride and 5% concentrated hydrochloric acid was extruded as a core solution in the usual manner. The extruded filament was passed through a spinning cell having a length of 3 m in which a nitrogen gas at 60° C. was counter-currently flowing at a rate of 1.5 m/sec. Then, the filament was introduced into a water bath containing 10% acetone and subsequently introduced into another water bath at 30° C. for removing the solvent.

The spinnability was excellent and the dope extruded had a good thread forming property without being broken. The take-up speed was 110 m/min. The resulting fiber was cut at various intervals of length and the core solution in the hollow portion thereof was removed. The cut fiber was further washed and then introduced into a glycerine bath and dried at 40° C. to a constant length. The hollow fiber obtained was transparent and had a uniform cross section close to that of a true circle. Both ultrafiltration and permeability properties of the fiber were excellent.

EXAMPLE 6

A spinning solution was made up from 28 parts of cellulose acetate having a mean degree of polymerization of 185 and a degree of acetylation of 40% dissolved in a mixed solvent of 69 parts of acetone and 3 parts of water. The spinning solution was extruded from an annular slit having an external diameter of 1.5 mm and an internal diameter of 1.0 mm. Simultaneously an aqueous solution containing 20% sodium chloride and 6% sodium hydroxide was introduced into the interior of the extruded dope. The spinning solution was maintained at 38° C. and the extruded filament was passed through a spinning cell having a length of 2 m in which an inert gas at 90° C. was countercurrently flowing at a rate of 1.2 m/sec. The filament was thereafter introduced into a coagulating bath consisting of a aqueous solution containing 20% acetone and then introduced into a water bath and allowed to stand therein so that the alkaline aqueous core solution was dialyzed through the membrane by dialysis. The spinnability of the filament was excellent and it had a good thread forming property. The hollow fiber had a uniform cross section of substantially a true circle and was obtained very stably with a maximum take-up speed of 136 m/min. The fiber was plasticized by glycerine and dried at 60° C. to a constant length. The hollow fiber had a dry tensile strength 1.2 g/d and had excellent dialysis and ultrafiltration properties. According to the infrared spectrum for the fiber obtained in this Example, the membrane was converted to cellulose by total hydrolysis of the original cellulose acetate.

EXAMPLE 7

The spinning solution prepared in Example 5 was wet spun into a mixed acetone-water bath (82:18) containing 5% ammonium chloride. Simultaneously, a 20% ammonium chloride aqueous solution was extruded as a core solution. The resulting gelled filament was further introduced into a water bath and was dried to a constant length. The spinnability of this Example is very good. The resulting hollow fiber had very good ultrafiltration properties.

EXAMPLE 8

The experimental conditions were the same as in Example 5 except that an aqueous solution containing 18% potassium sulfate and 6% concentrated sulfuric acid was used as the core solution and the temperature of the nitrogen gas was 90° C.

The spinnability was very good. The filament being passed through the spinning cell was dipped into a water bath for a considerable time for washing, whereby the core solution in the hollow fiber was replaced by water through dialysis. The fiber was subsequently dried to a constant length. The hollow fiber obtained was rather transparent and had a uniform cross section close to that of a true circle. It had an excellent reverse osmosis property.

An analysis showed that hydrolysis of the cellulose acetate had taken place up to one half the membrane thickness from the inner wall surface of the hollow fiber.

EXAMPLE 9

A commercial type of cellulose acetate butyrate was dissolved in a mixed solvent of 70 parts acetone and 30 parts methyl Cellosolve acetate to produce a 24% spinning solution. This solution was extruded from an annular slit having an external diameter of 2.0 mm and an internal diameter of 1.4 mm. A 28% potassium acetate aqueous solution was simultaneously extruded as a core liquid.

The spinnability of the material was very stable and the extruded dope filament had a superior thread forming property. A transparent and uniform hollow fiber was thus manufactured.

The spun dope filament was passed through an atmosphere of dried inert gas at 90° C. to vaporize a large amount of the solvent therefrom and was then introduced into a water bath to remove the remainder of the solvent completely. After being dried, the fiber was subjected to heat treatment. The fiber thus obtained was an excellent reverse osmosis membrane.

An additional spinning experiment was carried out through the use of an aqueous core solution containing 20% sodium acetate and 5% sodium hydroxide, or an aqueous solution of 30% sodium acetate instead of the potassium acetate aqueous solution of the Example. Hollow fibers having good transparency, superior strength property, and superior ultrafiltration properties could be obtained in this manner. The spinnability was stable and excellent.

In these experiments it was also found that hydrolysis had taken place at the inner wall surface of the hollow fiber to regenerate cellulose. The degree of hydrolysis in the membrane varied in going from the inner wall to the external wall which was composed of the original cellulose acetate butyrate.

EXAMPLE 10

Cellulose propionate having a mean degree of polymerization of 150 was dissolved in acetone to produce a 29% spinning solution. This solution was extruded from the annular slit in the manner specified in Example 1, while a 25% sodium phenoxide aqueous solution was used as a core solution.

A transparent and uniform hollow fiber was obtained with good spinnability. The fiber had a high tensile strength and an excellent ultrafiltration performance.

EXAMPLE 11

In this Example, 22 parts of cellulose triacetate having a mean degree of polymerization of 360 and a degree of acetylation of 60.5 were dissolved in a mixed solvent consisting of methylene chloride and methanol (90:10) to prepare a spinning solution. This solution was extruded from an annular slit while simultaneously a 20% sodium phosphate aqueous solution was extruded from an inner orifice. The hollow fiber had very stable spinnability and had a transparent appearance.

After a large amount of solvent was vaporized, the filament was introduced into a water-methanol bath (90:10) and further dipped in water for a time sufficient to remove the sodium phosphate by dialysis and then dried at 60° C. to a constant length.

The hollow fiber thus obtained evidenced excellent performance as a reverse osmosis membrane. An analysis showed that hydrolysis had occurred at the inner wall surface of the hollow fiber, so that the inner wall surface was hydrolyzed to substantially cellulose and the degree of hydrolysis decreased in going from the inner wall surface to the external wall surface.

REFERENCE EXAMPLE 3

In place of the spinning solution used in Reference Example 2, a commercial polymethylmethacrylate plate was used for preparing a spinning solution by dissolving 28 parts of the resin in 72 parts of acetone. The solution was extruded in the same manner as in Reference Example 2 and a 3% sodium acetate or 3% sodium chloride aqueous solution was extruded as a core solution. The hollow fiber obtained in both instances became whitish instantaneously and was very brittle. The extruded dope had a very poor thread forming property and the maximum take-up speed was 16 m/min.

EXAMPLE 12

In place of the spinning solution in Example 1, 28 parts of acrylonitrile-vinyl acetate copolymer (94:6) having intrinsic viscosity of 169 dl/g in dimethyl formamide at 30° C. was dissolved in 72 parts of dimethyl acetoamide to prepare a spinning solution. The solution was maintained at 55° C. and was extruded as a sheath solution as described in Example 1. Simultaneously an aqueous solution containing 20% potassium chloride and 3% potassium hydroxide was extruded as a core solution. The extruded filament was introduced through a spinning cell in which a nitrogen gas was flowing as 120° C.

Subsequent processing was carried out as described in Example 1. The hollow fiber had a high degree of transparency, good strength properties, and exhibited a superior permeability. The maximum take-up speed was 132 m/min.

According to the infrared spectra, absorption spectra of carboxylate and amide were observed at the inner wall surface of the hollow portion of the fiber, and nitrile groups were converted to amide groups and some of them were further hydrolyzed to the carboxylic acid. At the region near the external wall surface, the hollow fiber was still composed of the original acrylonitrile-vinyl acetate copolymer.

EXAMPLE 13

In place of the spinning solution used in Example 3, 26 parts of crushed commercial polymethylmethacrylate plate were dissolved in 74 parts of acetone to prepare a spinning solution. The solution was extruded and simultaneously an aqueous solution containing 20% potassium carbonate and 5% potassium hydroxide was extruded in the same manner as described in Example 3, resulting in a transparent fiber with a stable spinning property. The extruded dope filament was passed through the same spinning cell in which nitrogen gas was flowing at 70° C. and then introduced into the water bath. The fiber obtained was cut at predetermined lengths and the core liquid was removed therefrom. The fiber was then washed with 2% acetic acid solution and subsequently washed with water and plasticized by glycerine before being dried at 30° C.

The hollow fiber had a cross section close to that of a true circle and a very high uniformity could be obtained. The fiber had a dry tensile strength of 1.8 g/d and had superior ultrafiltration and dialysis properties.

In the hollow fiber obtained in this Example, the inner wall surface was almost completely hydrolyzed so that ester groups were changed to carboxylic acid groups, and the hydrolyzed parts were relatively limited to the inner wall surface, while the parts nearer to the external wall surface were still substantially polymethylmethacrylate. Practical blood dialysis by the use of a dialyzer with the hollow fiber obtained in this Example showed almost no blood coagulation and a superior anti-thrombus property.

EXAMPLE 14

A spinning solution was prepared from 23 parts of polymethylmethacrylate having a molecular weight of about 48,000 dissolved in 77 parts of acetone. The spinning solution was maintained at 38° C. and then extruded from an annular slit. An aqueous solution containing 25% calcium chloride and 5% sodium hydroxide was extruded simultaneously as a core solution. The extruded filament was introduced into a mixed solvent of water-acetone (90:10) after being passed through a gaseous space 30 cm in length. The coagulated filament was subsequently washed with water at 30° C. containing acetic acid. The resulting hollow fiber was wound up and then cut at regular intervals of length to remove the salt solution from the hollow portion. The fiber was further washed with a 1% acetic acid aqueous solution and washed with water and plasticized by glycerine before being dried. The inner wall surface of this fiber was hydrolyzed to polymethacrylic acid while the portions nearer the external surface remained as the original polymethylmethacrylate.

A blood dialyzer using the hollow fiber of this Example evidenced a superior property of removing urea and also a superior anti-thrombus property.

EXAMPLE 15

In place of the spinning solution of Example 9, poly vinyl chloride having an intrinsic viscosity of 2.0 dl/g in cyclohexanone at 30° C. was dissolved in tetrahydrofuran to prepare a 22% spinning solution. The extruded filament had excellent spinnability and thread forming properties. The fiber obtained was rather transparent and uniform in its configuration, and was found to be very suitable as an ultrafiltration membrane.

EXAMPLE 16

The hollow fiber obtained in Example 2 was dipped in acetone and allowed to stand for one hour. A greater part of this fiber was dissolved in the acetone except for a portion near the inner wall surface. The acetone-insoluble part was dissolved in dimethyl sulfoxide containing 10% paraformaldehyde and a membrane was prepared from this solution. Infrared spectra showed no carbonyl groups and the hydroxyl groups increased at the inner wall surface of the hollow fiber which was hydrolyzed to cellulose, while the soluble portion gave an infrared spectrum similar to that of cellulose acetate.

EXAMPLE 17

Polymethylmethacrylate having a molecular weight of about 30,000 was dissolved in acetone to prepare a 24.5% spinning solution. An aqueous solution containing 20% sodium phosphate and 6% sodium hydroxide was used as the core solution. The spinning was carried out under very stable conditions. The extruded dope filament was introduced downwardly through an air space of 30 cm in length and then introduced into an aqueous solution containing 10% phosphoric acid. The filament was then washed by water. The filament was subsequently cut at regular intervals of length to remove the salt aqueous core solution from the hollow portion and then washed with a 1% acetic acid aqueous solution before being washed with water and dried at room temperature.

From this hollow fiber, two thin membranes of the inner and outer wall portions were sliced in spiral fashion with a razor. An absorption of methyl ester of a carboxylic acid was found at the outer wall surface part. This means that the outer wall was not hydrolyzed. An absorption of free carboxylic acids was found, and a disappearance of the absorption of the methyl ester was evidenced at the inner surface. This showed that the inner wall was hydrolyzed.

EXAMPLE 18

The hollow fibers obtained in Example 2 were dyed with a direct dye capable of dyeing cellulose but which does not dye cellulose acetate. After being dyed, the fibers were washed with water. The cross sections of the fiber were observed through a microscope. The inner wall surface of the fiber obtained in Example 2 was dyed while the outer portion thereof was scarcely dyed. This shows that only the portion nearer to the inner wall surface was hydrolyzed to cellulose.

On the other hand, when the fiber obtained in Example 6 was dyed in the same way as mentioned above, the part closer to the inner wall surface was deeply dyed, while the degree of dyeing became smaller as the outer wall surface was approached. This showed that the degree of hydrolysis increased as the inner wall surface was approached. In order to confirm this, the fiber membrane was divided into three parts, one being close to the inner wall surface, an intermediate part, and a part close to the outer wall surface. The absorption ratio of carbonyl group to methylene group, $D_{co}(1740\ cm^{-1})/D_{CH_2}(2870\ cm^{-1})$ was measured based upon the infrared spectra of the three parts. The absorption ratio was nearly zero for the part nearest to the inner wall surface, 4.70 for the part closest to the outer wall surface, and 1.76 for the intermediate part. According to these results, it was confirmed that hydrolysis was more predominant as the inner wall surface was approached.

The same absorption ratio was measured for the parts closest to the inner and outer wall surfaces of the fiber obtained in Example 2. The ratio was 0.23 and 5.10 respectively. This shows that the inner wall surface was almost completely hydrolyzed, while the portion nearest the outer wall surface was not substantially hydrolyzed. The absorption ratio measured for the original cellulose acetate was 5.50.

I claim as my invention:

1. A method of manufacturing a hollow fiber which comprises:
    providing a spinning solution of a water miscible organic solvent having a dipole moment less than $3.6\times10^{-18}$ esu and a high molecular weight compound selected from the group consisting of polyacrylonitrile, a copolymer of acrylonitrile, a cellulose ester, polymethylmethacrylate, and poly-γ-benzyl glutamate, extruding said spinning solution through an annular slit, simultaneously extruding an alkaline or acid aqueous salt solution from an orifice encircled by said annular slit, said aqueous salt solution having a a salt content of 15 to 50% by weight, being a non-coagulant for said spinning solution, being immiscible with said spinning solution and being capable of developing a phase separation with said solvent by a salting out effect, there being sufficient alkali or acid present in said aqueous salt solution to effect hydrolysis of said high molecular weight compound, and introducing the extruded spinning solution with said aqueous salt solution contained therein into a coagulating bath to initiate coagulation.

2. A method according to claim 1 in which said salt is an inorganic salt selected from the group consisting of lithium salts, sodium salts, ammonium salts, potassium salts, magnesium salts, calcium salts, cadmium salts, and zinc salts.

3. A method according to claim 1 in which said salt is an organic salt selected from the group consisting of organic carboxylic acid salts, alcoholates, phenolates, and organic sulfonic acid salts.

4. A method according to claim 1 in which said spinning solution is extruded downwardly and passed through a space of at least 5 mm in length before being passed into a coagulating bath.

5. A method according to claim 4 in which said extruded spinning solution passes through a space having a length of at least 10 mm.

6. A method according to claim 4 in which said coagulating bath consists predominantly of water.

7. A method according to claim 1 in which the salt in said aqueous salt solution is removed through the membrane of the hollow fiber by dialysis.

8. A method according to claim 1 in which the aqueous salt solution is removed by cutting the hollow fiber in predetermined positions and then neutralizing the same.

9. A method according to claim 1 in which the aqueous salt solution is neutralized externally by dipping the hollow fiber into an alkaline or acidic solution.

10. A hollow fiber manufactured by the method of claim 1, in which the portion closest to the internal wall of the hollow fiber and the portion closest to the external wall thereof differ from each other in their degree of hydrolysis.

11. A hollow fiber according to claim 10 in which the outer surface of the hollow fiber is not hydrolyzed.

12. A hollow fiber according to claim 10 in which portions of the hollow fiber closest to its inner surface are more readily swellable in water than portions near the outer surface thereof.

* * * * *